United States Patent [19]

Jones et al.

[11] 4,392,676

[45] Jul. 12, 1983

[54] HOSE HANDLING DEVICE

[75] Inventors: Robert T. Jones, Morrisville, Pa.; Martin B. Harrison, Trenton, N.J.

[73] Assignee: Goodall Rubber Company, Trenton, N.J.

[21] Appl. No.: 350,812

[22] Filed: Feb. 22, 1982

[51] Int. Cl.³ .................. F16L 3/00; F16L 27/00; F16L 11/00

[52] U.S. Cl. .................................. 285/61; 285/272; 285/94

[58] Field of Search ............... 285/61, 272, 38, 94; 248/58, 62

[56] References Cited

U.S. PATENT DOCUMENTS

| | | | |
|---|---|---|---|
| 2,519,203 | 8/1950 | Stoecklin | 285/61 |
| 2,643,079 | 6/1953 | Pitt | 248/62 |
| 3,352,582 | 11/1967 | Mankin et al. | 285/61 X |
| 4,047,683 | 9/1977 | Takeuchi | 248/62 |

Primary Examiner—Richard J. Scanlan, Jr.

Attorney, Agent, or Firm—Harding, Earley, Follmer & Frailey

[57] ABSTRACT

A hose handling device has a fitting adapted to be secured to one end of a hose. The fitting has a peripheral groove in its exterior surface in which a ring is mounted for relative rotational movement with respect to the fitting. An eye adapted to be engaged by a hook is fixedly secured to said ring. Advantageously, the eye is formed by opposed legs which conform to the outer diameter of the ring and are secured thereto by welding or the like. Preferably, the inner diameter of the ring has a relatively flat central portion each side of which is connected to a slightly beveled portion which, in turn, may be connected to a more sharply beveled portion connected to an exterior face of the ring. To facilitate swivelling the inner diameter of the ring may have a peripheral groove communicating with a grease fitting mounted on the exterior of the ring. The fitting may be connected to one end of a hose and have its other end threaded for connection to a threaded fitting.

8 Claims, 3 Drawing Figures

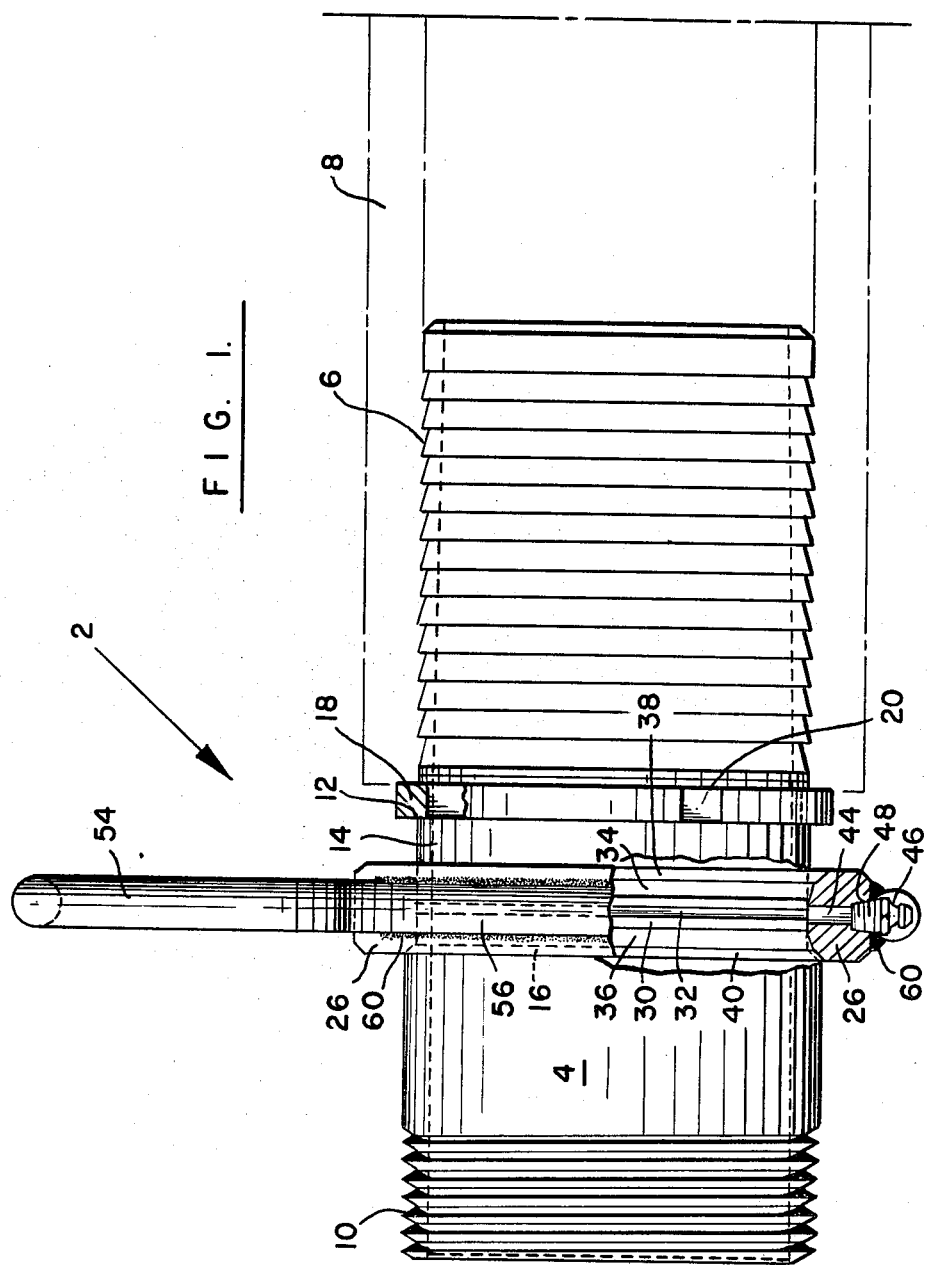

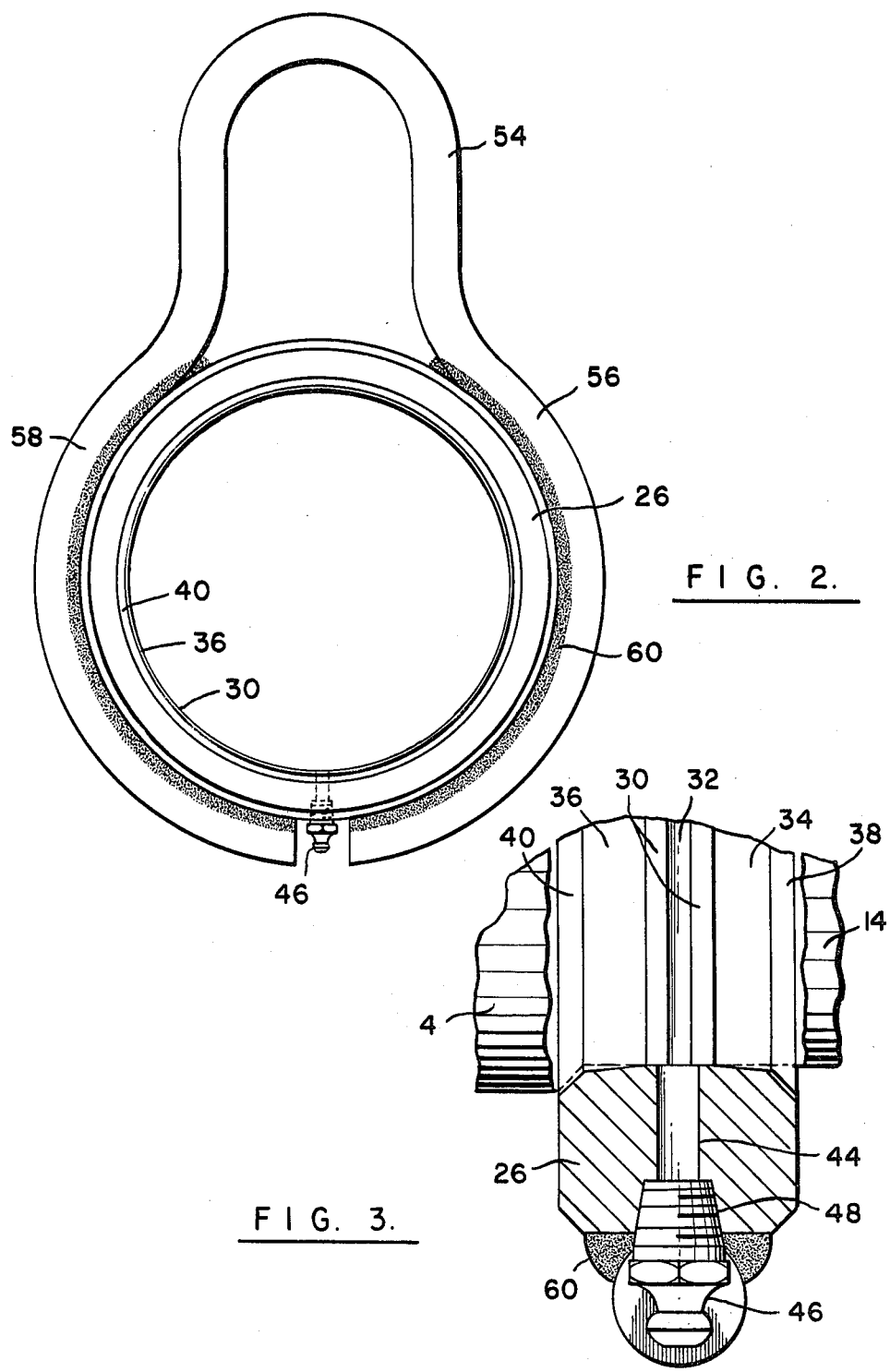

HOSE HANDLING DEVICE

TECHNICAL FIELD

This invention is in the field of devices for handling hose such as, for example, steam hose for driving pilings to anchor off-shore drilling rigs and hose for handling liquid petroleum gas. Such hose is shipped and stored in the coiled condition. It is difficult to uncoil such hose without damaging the hose particularly in the case where it is made of metal or reinforced with strands of metal. A lifting rig such as a crane is usually attached to one end of the hose to draw it out of the coil form. The attachment of the crane to the hose at one end and the weight of the uncoiled hose usually restrains the hose from assuming an unstressed condition during uncoiling which frequently results in serious damage to the hose.

In accordance with this invention, a device is provided for attaching the free end of the hose to a lifting device in such a manner that the hose is free to rotate on its axis adjacent its free end to relieve the strain imposed incident to uncoiling.

BRIEF SUMMARY OF INVENTION

A hose handling device has a fitting adapted to be secured to one end of a hose. The fitting has a peripheral groove in its exterior surface in which a ring is mounted for rotational movement with respect to the fitting. An eye adapted to be engaged by a hook is fixedly secured to said ring. Advantageously, the eye is formed by opposed legs which conform to the outer diameter of the ring and are secured thereto by welding or the like. Preferably, the inner diameter or the ring has a relatively flat central portion each side of which is connected to a slightly beveled portion which, in turn, may be connected to a more sharply beveled portion connected to an exterior face of the ring. To facilitate swivelling the inner diameter of the ring may have a peripheral groove communicating with a grease fitting mounted on the exterior of the ring. The fitting may be connected to one end of a hose and have its other end threaded for connection to a threaded fitting.

BRIEF DESCRIPTION OF THE DRAWINGS

FIG. 1 is a side elevation, partially broken away, of a hose handling device in accordance with the invention;

FIG. 2 is an end elevation of the ring and eye of the hose handling device of FIG. 1; and FIG. 3 is an enlarged view, partially broken away, of the grease fitting and associate structure of the hose handling device of FIG. 1.

DETAILED DESCRIPTION OF THE PREFERRED EMBODIMENT

Adverting to FIG. 1, a hose handling device 2 in accordance with the invention has a fitting 4 provided with a barbed portion 6 adapted to secure fitting 4 inside a hose indicated in phantom at 8.

Fitting 4 has a groove 12 formed by a reduced diameter portion 14 of fitting 4 adjacent shoulder 16 which forms one side of groove 14 the other side being formed by a snap ring 18 in groove 20 in fitting 4.

A ring 26 is mounted in groove 14 and retained therein by shoulder 16 and snap ring 18. Ring 26 is free for relative axial and rotational movement with respect to fitting 4. Advantageously, the minimum inner diameter of ring 26 is slightly larger than reduced diameter portion 14 for example by from about 3 to about 6 mm.

As best seen in FIG. 3, the inner diameter of ring 26 has a substantially flat central peripheral portion 30 in which a peripheral groove 32 is centrally located. Leading outwardly from flat portion 30 are slightly beveled portions 34 and 36 which in turn connect with more acutely beveled portions 38 and 40 respectively. Advantageously bevel portions 34 and 36 will decline from the flat portion 30 by from about 6° to about 10°. Bevel portions 38 and 40 will advantageously decline from bevel portions 34 and 36 respectively by from about 30° to about 35°. Beveled portions 34 and 36 function to minimize the surface area of the ring 26 bearing on reduced diameter portion 14 of fitting 4 in order to facilitate movement of ring 26 irrespective of the direction in which the force is applied.

A passage 44 drilled in ring 26 connects groove 32 to a conventional grease fitting 46 threadably secured to ring 26 as indicated at 48.

Adverting to FIG. 2, an eye 54 has a pair of arms 56 and 58 each of which is curved to conform to the outer diameter of ring 26 and welded thereto as indicated at 60. Since it is preferable to have eye 54 round in cross section, it is conveniently made from steel bar stock.

Ring 26 is readily assembled to fitting 4 by slipping the ring 26 over the barbed portion 5 and the reduced diameter portion 14 of fitting 4 both of which have a diameter smaller than the inner diameter of ring 26. Snap ring 18 is then expanded and passed over barbed portion 6 and released into groove 20 to retain the ring 26. The assembly is then secured to the interior of said hose.

The hose is readily uncoiled by attaching a lifting rig, for example a hook of the whip of a crane, to eye 54 and hauling the hose handling device 2 and the free end of hose 8 upwardly to uncoil the hose. As the hose uncoils, it is free to turn on its axis with respect to ring 26 which frees the hose from undue stress and hence from any damage. The beveled portions of the inner diameter of ring 26 reduce the maximum area of contact between ring 26 and fitting 4 to reduce friction resisting the movement of hose 8. Further, it is desirable to introduce grease into groove 32 through fitting 46 to further reduce friction.

It will be understood that the above described embodiment is illustrative and is not intended to be limiting.

I claim:

1. A hose handling device comprising:
   a fitting adapted to be secured to one end of a hose having a peripheral groove in its exterior surface;
   a ring mounted in said groove for relative rotational movement with respect to said fitting; and
   an eye adapted to be engaged by a hook fixedly secured to said ring.

2. A device in accordance with claim 1 in which the eye is formed by opposed legs a portion of which are secured to the ring.

3. A device in accordance with claim 1 in which the inner diameter of the ring has a relatively flat central portion each side of which is connected to a slightly beveled portion.

4. A device in accordance with claim 1 in which the inner diameter of the ring has a peripheral groove communicating with a grease fitting mounted on the exterior of the ring.

5. A device in accordance with claim 1 in which the fitting has one end adapted to be secured to a hose and the other end is threaded for connection to a threaded fitting and the groove is intermediate the said ends.

6. A device in accordance with claim 1 in which the groove is formed by a shoulder adjacent a reduced diameter portion of the fitting and a removable ring mounted on the fitting at a point spaced from said shoulder.

7. A hose handling device comprising:
a fitting adapted to be secured to one end of a hose having a first groove formed by a shoulder adjacent a reduced diameter portion and a snap ring received in a second groove adjacent the reduced diameter portion and spaced from said shoulder,
a ring mounted in said first groove for relative rotational movement with respect to said fitting and having a relatively flat central portion each side of which is connected to a slightly beveled portion on its inner periphery,
an eye formed by a pair of opposed legs each of which has a portion thereof contoured to overlie the outer diameter of the ring and secured to said outer diameter,
said ring having a peripheral groove in the flat central portion, and
a grease fitting mounted on the ring and communicating with said last mentioned groove.

8. A hose handling device comprising:
a fitting adapted to be secured to one end of a hose having a first groove formed by a shoulder adjacent a reduced diameter portion and a snap ring received in a second groove adjacent the reduced diameter portion and spaced from said shoulder,
a ring mounted in said first groove for relative rotational movement with respect to said fitting and having a relatively flat central portion each side of which is connected to a slightly beveled portion declining from the central portion at an angle of from about 6° to 10°,
an eye formed by a pair of opposed legs each of which has a portion thereof contoured to overlie the outer diameter of the ring and secured to said outer diameter,
said ring having a peripheral groove in the flat central portion, and
a grease fitting mounted on the ring and communicating with said last mentioned groove.

* * * * *